(12) United States Patent
Liu

(10) Patent No.: US 10,117,464 B2
(45) Date of Patent: Nov. 6, 2018

(54) VOICE CONTROL METHOD FOR ELECTRONIC CIGARETTE AND ELECTRONIC CIGARETTE

(71) Applicant: SHENZHEN KIMSEN TECHNOLOGY CO., LTD, Shenzhen, Guangdong (CN)

(72) Inventor: Qiuming Liu, Guangdong (CN)

(73) Assignee: SHENZHEN KIMSEN TECHNOLOGY CO., LTD, Shenzhen (CN)

( * ) Notice: Subject to any disclaimer, the term of this patent is extended or adjusted under 35 U.S.C. 154(b) by 11 days.

(21) Appl. No.: 15/304,105

(22) PCT Filed: Apr. 14, 2014

(86) PCT No.: PCT/CN2014/075315
§ 371 (c)(1),
(2) Date: Oct. 14, 2016

(87) PCT Pub. No.: WO2015/157894
PCT Pub. Date: Oct. 22, 2015

(65) Prior Publication Data
US 2017/0035118 A1    Feb. 9, 2017

(51) Int. Cl.
*A24F 47/00*    (2006.01)
*G06F 3/16*    (2006.01)

(52) U.S. Cl.
CPC ............ *A24F 47/008* (2013.01); *G06F 3/167* (2013.01)

(58) Field of Classification Search
None
See application file for complete search history.

(56) References Cited

U.S. PATENT DOCUMENTS

2002/0114223 A1* 8/2002 Perlman ................ A24F 15/005
368/109
2014/0174459 A1* 6/2014 Burstyn ................ A24F 47/008
131/273

(Continued)

FOREIGN PATENT DOCUMENTS

CN    203262287 U    11/2013
CN    203353682 U    12/2013

OTHER PUBLICATIONS

International Search Report of PCT Patent Application No. PCT/CN2014/075315 dated Jan. 13, 2015.

*Primary Examiner* — Eric Yaary

(57) ABSTRACT

The invention is related to a voice control method for an electronic cigarette and an electronic cigarette, used for performing vocal praising when a one-time smoking duration exceeds a longest one-time smoking duration. The method executes the following steps when a smoking signal is received: S1, an electronic cigarette starts an atomization operation, and times a current one-time smoking duration; S2, determine whether the current one-time smoking duration is greater than a longest one-time smoking duration recorded in the electronic cigarette, and if yes, proceed to step S3, otherwise, proceed to step S4; S3, a voice praising a user is played, and the longest one-time smoking duration is updated using the current one-time smoking duration, and the method enters step S4; S4, the method waits for the smoking signal to be received once again, and when the smoking signal is received, proceeds to step S1.

13 Claims, 5 Drawing Sheets

(56) References Cited

U.S. PATENT DOCUMENTS

2014/0305450 A1* 10/2014 Xiang ................... A24F 47/008
 131/329
2015/0245660 A1* 9/2015 Lord ..................... A24F 47/008
 131/328
2016/0278435 A1* 9/2016 Choukroun ........... A24F 47/008

* cited by examiner

VOICE CONTROL METHOD FOR ELECTRONIC CIGARETTE AND ELECTRONIC CIGARETTE

TECHNICAL FIELD

The present invention relates to daily electronic products, and more particularly relates to a voice control method for electronic cigarette and an electronic cigarette.

BACKGROUND

The electronic cigarette is also known as the virtual cigarette, and is mainly configured for quitting smoking and replacing cigarettes. It has the same appearance with the cigarette and similar flavor. It has much more flavors than regular cigarettes. Users can suck smoke, flavor and feeling like the cigarette.

The electronic cigarette does not contain the harmful ingredients such as tar and suspended particles in the cigarette. Thus if users transfer the time of smoking cigarettes to electronic cigarettes, then the purpose of quitting smoking can be realized, which makes users keep away from harmful chemical substances such as nicotine.

The electronic cigarette in prior art is rigid, and cannot interact with the user. For the people using the electronic cigarette to quit smoking, the electronic cigarette cannot give users proper encouragement, and cannot compliment users to smoke the electronic cigarette more to quit smoking addiction. And quitting smoking is a long process, it may bore people. If the interaction between the user and the electronic cigarette can be realized, then users' experience can be improved, and it can bring users new feeling.

So there are defects in prior art, which need to be improved.

SUMMARY

The technical problem that the present invention will solve is, aiming at the above-mentioned defect that the electronic cigarette cannot encourage users in time, providing a voice control method for electronic cigarette and an electronic cigarette.

The technical solution that the present invention applies to solve the technical problem is: providing a voice control method for an electronic cigarette, the method comprises following steps when a smoking signal is received:

S1. start an atomization operation for an electronic cigarette, and time a current one-time smoking duration, after timing, proceed step S2, the one-time smoking represents a process of receiving an one-time smoking signal;

S2. determine whether the current one-time smoking duration is greater than a longest one-time smoking duration recorded in the electronic cigarette, if yes, then proceed to step S3; otherwise, proceed to step S4;

S3. play compliment voice to a user, and use the current one-time smoking duration to update the longest one-time smoking duration, proceed to the step S4;

S4. wait for receiving the smoking signal again, and proceed to the step S1 when receiving the next smoking signal.

In the voice control method for an electronic cigarette of the present invention, the method comprises adding one to one-time smoking time when receiving the smoking signal;

the method comprises step S0 before the step S1: start a current smoking section, the one-time smoking time is set as 0, if a time interval between a current one-time smoking and a last one-time smoking is larger than a first preset time, then the current one-time smoking represents a start of a smoking section;

the step S4 further comprises: time when waiting for receiving the smoking signal again simultaneously;

in the step S4: if a timing time reaches the first preset time, then proceed to step S5, if the smoking signal is received before the timing time reaches the first preset time, add one to the one-time smoking time, then proceed to the step S1;

S5. determine whether the one-time smoking time of the current smoking section is greater than a maximum one-time smoking time recorded in the electronic cigarette, if yes, then proceed to a step S6; otherwise, proceed to a step S7;

S6. play compliment voice to the user, and use the one-time smoking time of the current smoking section to update the maximum one-time smoking time, proceed to the step S7;

S7. end the current smoking section.

In the voice control method for an electronic cigarette of the present invention, the method further comprises after the step S7:

S8. wait for receiving the smoking signal again, and start timing;

if a timing time reaches a second t preset time, then proceed to step S9, if receiving a smoking signal before the timing time reaches the second preset time, then proceed to the step S0;

S9. play reminding voice to the user.

In the voice control method for an electronic cigarette of the present invention, proceed to the step S8 after the step S9.

In the voice control method for an electronic cigarette of the present invention, the user compliment voice comprises: music compliment and language compliment, playing compliment voice and lighting or flashing simultaneously.

In the voice control method for an electronic cigarette of the present invention, the method further comprises: turn off or on a voice compliment function at any time.

In the voice control method for an electronic cigarette of the present invention, playing compliment voice to the user comprises following steps:

a microprocessor sends a control signal to a voice microcontroller to designate a voice code that need to be output;

the voice microcontroller chooses the designated voice code of the microprocessor to compound to output to a speaker;

the speaker outputs a voice.

The present invention further provides an electronic cigarette, the electronic cigarette comprises an atomizing module configured to atomize tobacco tar, a power supply module, a smoking switch configured for sending a smoking signal, and a controlling module configured for controlling the power supply module to supply power for the atomizing module when receiving the smoking signal, the electronic cigarette further comprises a voice module;

the power supply module, the atomizing module, the smoking switch and the voice module are connected to the controlling module, respectively;

the controlling module is configured for recording a longest one-time smoking duration, the one-time smoking represents a process of receiving an one-time smoking signal;

the controlling module is further configured for timing for a current one-time smoking duration, and determining whether the current one-time smoking duration is greater than the longest one-time smoking duration recorded in the electronic cigarette, if yes, then controlling the voice module to play compliment voice to a user, and using the current one-time smoking duration to update the longest one-time smoking duration.

In the electronic cigarette of the present invention, the controlling module is further configured for recording a maximum one-time smoking time, the controlling module is further configured for counting a one-time smoking time of a current smoking section, and determining whether the one-time smoking time of the current smoking section is greater than the maximum one-time smoking time recorded in the electronic cigarette, if yes, then controlling the voice module to play compliment voice to a user, and using the one-time smoking time of the current smoking section to update the maximum one-time smoking time;

if a time interval between a current one-time smoking and a last one-time smoking is larger than a first preset time, then a current one-time smoking represents a start of a smoking section, a number of a one-time smoking time in the smoking section is N, and a time interval between two adjacent one-time smoking in a smoking section is smaller than the first preset time.

In the electronic cigarette of the present invention, the controlling module is further configured for timing when the current smoking section ends, if the controlling module do not receive the smoking signal in a second preset time, then controls the voice module to play reminding voice to the user.

In the electronic cigarette of the present invention, the controlling module comprises a microprocessor, the voice module comprises a voice microcontroller configured for recording various voice codes and a speaker;

the microprocessor is connected to the voice microcontroller, the voice microcontroller is connected to the speaker;

the microprocessor is configured for controlling the voice microcontroller to choose a voice code, the voice microcontroller is configured for choosing the designated voice code of the microprocessor to compound to output to the speaker.

In the electronic cigarette of the present invention, the electronic cigarette further comprises a function switch which is connected to the controlling module and is configured for turning on or off a voice compliment function.

In the electronic cigarette of the present invention, the voice module comprises a voice microcontroller configured for recording various voice codes and a speaker, a microprocessor is connected to the voice microcontroller, the voice microcontroller is connected to the speaker;

the power supply module comprises a battery, the atomizing module comprises a electrical hearting wire, the controlling module comprises the microprocessor and a MOS tube, the smoking switch is an air flow sensor, a source electrode of the MOS tube is connected to a cathode of the battery, a drain electrode of the MOS tube is connected to an anode of the battery via the hearting wire, a grid electrode of the MOS tube is connected to the microprocessor; a signal output end of the air flow sensor is connected to the microprocessor.

The beneficial effects of implementing the voice control method for electronic cigarette and an electronic cigarette of the present invention are: the present invention times for one-time smoking duration. If the one-time smoking duration is greater than the longest one-time duration recorded in the electronic cigarette, then the electronic cigarette gives a voice compliment. The interaction between the user and the electronic cigarette can be realized, which makes the user happy, encourages the user in time, and give the user the motivation to quit smoking and freshness, contributing to the user away from the cigarette to realize quitting smoking.

BRIEF DESCRIPTION OF THE DRAWINGS

The present invention will be further described with reference to the accompanying drawings and embodiments in the following.

DETAILED DESCRIPTION OF THE PREFERRED EMBODIMENT

In order to better understand the technical features, purpose and effect of the present invention, the preferred embodiment will be described in detail in the following.

Figure 1:
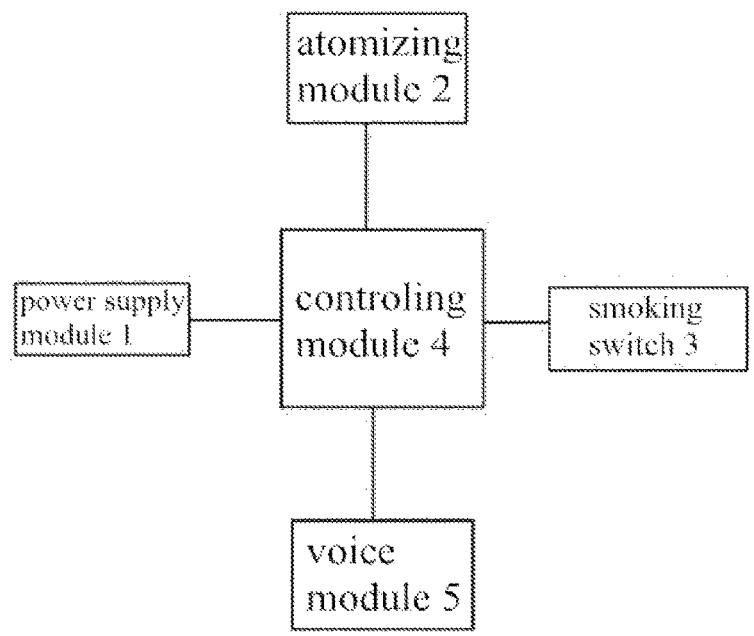
FIG. 1 is a structure diagram of the first embodiment of the electronic cigarette of the present invention.

FIG. 1 is a structure diagram of the first embodiment of the electronic cigarette of the present invention;

The electronic cigarette of the embodiment of the present invention, the electronic cigarette comprises an atomizing module 2 configured to atomize tobacco tar, a power supply module 1, a smoking switch 3 configured for sending a smoking signal, a controlling module 4 configured for controlling the power supply module 1 to supply power for the atomizing module 2 when receiving the smoking signal, wherein, the electronic cigarette further comprises a voice module 5;

the power supply module 1, the atomizing module 2, the smoking switch 3 and the voice module 5 are connected to the controlling module 4, respectively;

The voices that the voice module 5 plays comprise:

The first kind of voice: configured for praising for that the one-time smoking duration is greater than a longest one-time smoking duration recorded in the electronic cigarette. For example: "very good", "your smoking duration breaks the record again!". The default longest one-time smoking duration is 0.

The one-time smoking represents a process of receiving an one-time smoking signal. The one-time smoking duration is the duration of sending the one-time smoking signal, and is the duration of each smoke when users smoke.

Advantageously, the voices comprise:

The second kind of voice: configured for praising for that the one-time smoking time of the current smoking section is greater than a maximum one-time smoking time recorded in the electronic cigarette. For example: "your current smoking time breaks the record again!". The default maximum one-time smoking time is 0.

About the smoking section: if a time interval between a current one-time smoking and a last one-time smoking is larger than a first preset time, then a current one-time smoking represents a start of a smoking section, a number of a one-time smoking time in a smoking section is N (N≥1), and a time interval between two adjacent one-time smoking in a smoking section is smaller than a first preset time. The one-time smoking time of the current smoking section is the users' total continuous smoking quantity when the time interval between two adjacent one-time smoking in a smoking section is not greater than the first preset time. The continuous means the every smoking interval is not too long. Because the electronic cigarette works only when smoking. So the relatively intensive multiple one-time smoking belongs to a smoking section. For example, the first preset time is 30 s, which means that if the user starts to smoke after 30 s from the last smoking, then this smoke is denoted as a start of a smoking section. If the next smoke is in 30 s, then the next smoke belongs to this smoking section, and so on. Until there is no smoking in 30 s from the last smoking, then the smoking section ends.

Advantageously, the voices further comprise:

The third kind of voice: configured for reminding users when users do not smoke the electronic cigarette for a long time. For example "dear, you have not smoked for a long time".

Figure 2:
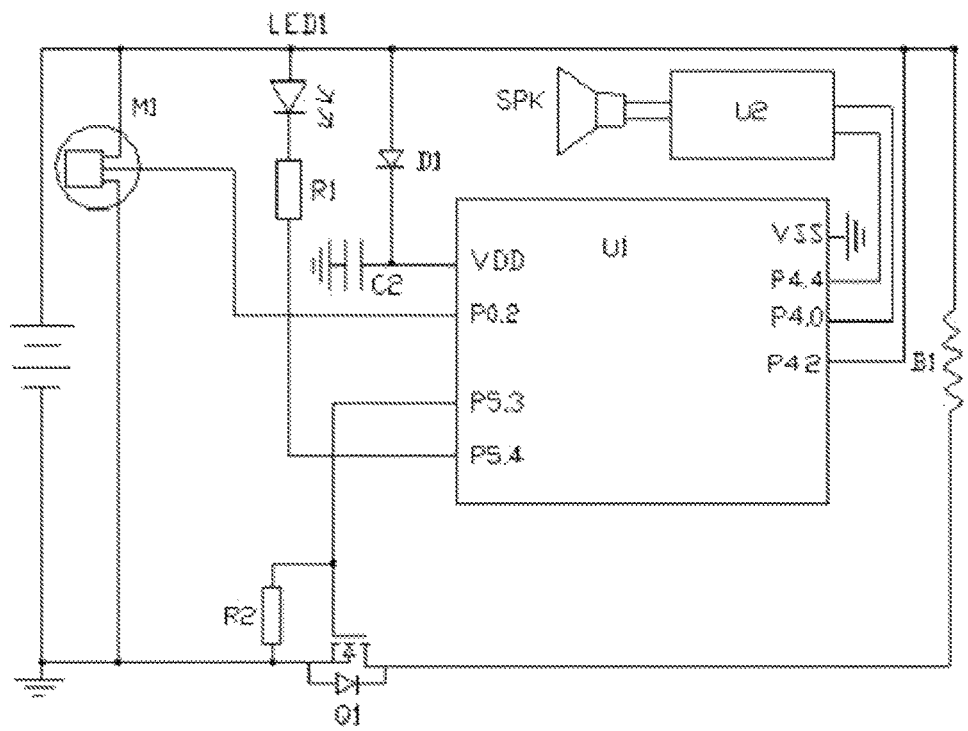
FIG. 2 is circuit diagram of the first embodiment of the electronic cigarette of the present invention.

FIG. 2 is circuit diagram of the first embodiment of the electronic cigarette of the present invention;

The power supply module 1 is a battery, the atomizing module 2 comprises an electrical heating wire B1, the smoking switch 3 is an air flow sensor M1, the model of the air flow sensor M1 is S087.

The voice module 5 comprises a HT86A72 voice microcontroller U2 and a speaker SPK; the voice microcontroller U2 is connected to the microprocessor U1, the SP+ pin and the SP− pin of the voice microcontroller U2 are connected to the anode and the cathode of the speaker SPK respectively.

The controlling module 3 comprises a microprocessor U1, the type of the microprocessor U1 is SN8P2711B, the controlling module 3 further comprises an N-type MOS tube Q1, a resistance R1, a resistance R2, a LED light LED1, a diode D1 and a capacitance C2;

A source electrode of the MOS tube Q1 is connected to a cathode of the battery, a drain electrode of the MOS tube Q1 is connected to an anode of the battery via the hearting wire B1, a grid electrode of the MOS tube Q1 is connected to the P5.3 pin of the microprocessor U1, the grid electrode of the MOS tube Q1 is further connected to the source electrode of the MOS tube Q1 via the resistance R2; an output end of the air flow sensor M1 is connected to the P0.2 pin of the microprocessor U1, the anode end and the cathode end of the air flow sensor M1 are connected to the anode and the cathode of the battery, respectively. The VDD pin of the microprocessor U1 is grounded via the capacitance C2, the VDD pin is further connected to the cathode of the diode D1, the anode of the diode D1 is connected to the anode of the battery. The anode of the LED light LED 1 is connected to the anode of the battery, the cathode of the LED light LED 1 is connected to the P5.4 pin of the microprocessor U1 via the resistance R1. The VSS pin of the microprocessor U1 is grounded.

The LED light LED 1 is configured for instructing whether the smoking signal is sensed, which is instructing whether the user is smoking.

When there is no air flow in the normal state, the P5.3 pin of the microprocessor U1 outputs low level, the MOS tube Q1 cuts off, so the battery and the electrical heating wire B1 are not electrically connected. Meanwhile, the P5.4 pin of the microprocessor U1 outputs high level, the LED light LED1 cuts off and does not light. When there is an air flow, the air flow sensor M1 senses the air flow signal to output a voltage signal to the P0.2 pin of the microprocessor U1, then the P5.3 pin of the microprocessor U1 outputs high level, the MOS tube Q1 conducts, then the battery and the electrical heating wire B1 are electrically connected, the electrical heating wire B1 heats and atomizes the tobacco tar. Meanwhile, the P5.4 pin of the microprocessor U1 outputs low level, the LED light LED1 conducts and lights. the LED light LED1 only conducts when the air flow sensor M1 sends the smoking signal, if the air flow sensor M1 stops sending the smoking signal, then the LED light LED1 stops lighting, the time that the MOS tube Q1 conducts can be same as the LED light LED1, or can be extended properly.

The process of the voice compliment of the one-time smoking duration is: when the P0.2 pin of the microprocessor U1 receives the smoking signal, the microprocessor U1 starts to time for the current one-time smoking duration, and stop timing when the smoking signal is received, if the timing time is larger than the longest one-time smoking duration, the microprocessor U1 controls the voice module to praise with the first kind of voice.

The process of the voice compliment of the one-time smoking time is: when the P0.2 pin of the microprocessor U1 receives the smoking signal, if it is a start of a smoking section, then the one-time smoking time is denoted as 1, then if the P0.2 pin receives the smoking signal again in the first preset time, then the one-time smoking time is added one, and so on, until the smoking signal is not received in the first preset time, the smoking section is considered to end. If the final one-time smoking time is larger than the maximum one-time smoking time, then the microprocessor U1 controls the voice module to praise with the second kind of voice.

The process of reminding users when users do not smoke the electronic cigarette for a long time: if a smoking section ends, and a smoking signal is not received in the second preset time, then the microprocessor U1 controls the voice module to praise with the third kind of voice.

Advantageously, when performing the voice compliment or reminding of either above-mentioned case, the P5.4 pin of the microprocessor U1 outputs a PWM signal, the LED light LED1 flashes, to cooperate with the voice function to realize the double enjoyment of the auditory and vision.

The process of the voice compliment or reminding performed by the voice module is: the choice of each voice is provided with a corresponding serial signal, the microprocessor U1 outputs a serial signal to the voice microcontroller U2, the voice microcontroller U2 chooses the corresponding voice code according to the serial signal, and synthesizes then outputs to the speaker SPK. The process that the voice microcontroller U2 synthesizes the voice to output is not a key point of the present invention, which is not described here.

Figure 3:
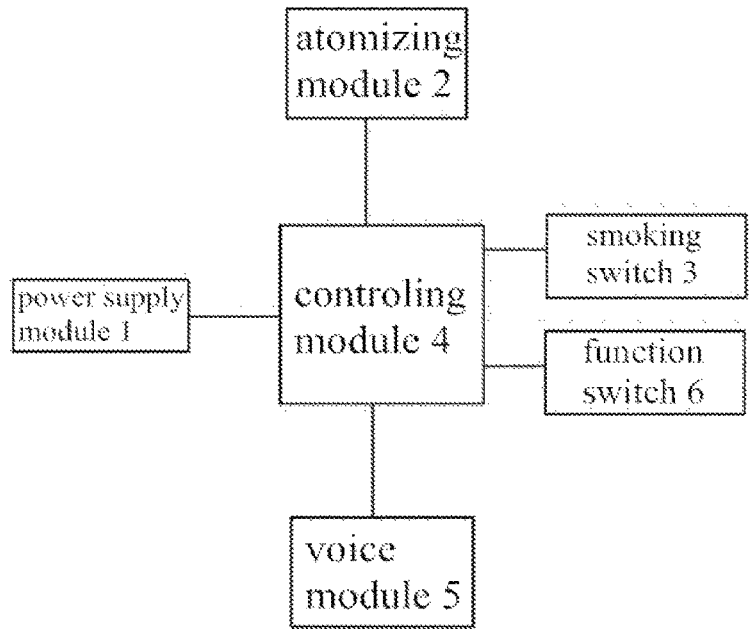
FIG. 3 is a structure diagram of the second embodiment of the electronic cigarette of the present invention.

FIG. 3 is a structure diagram of the second embodiment of the electronic cigarette of the present invention;

The different of the second embodiment with the first embodiment is: the electronic cigarette further comprises a function switch 6 which is connected to the controlling module 3 and is configured for turning on or off a voice compliment function.

Figure 4:
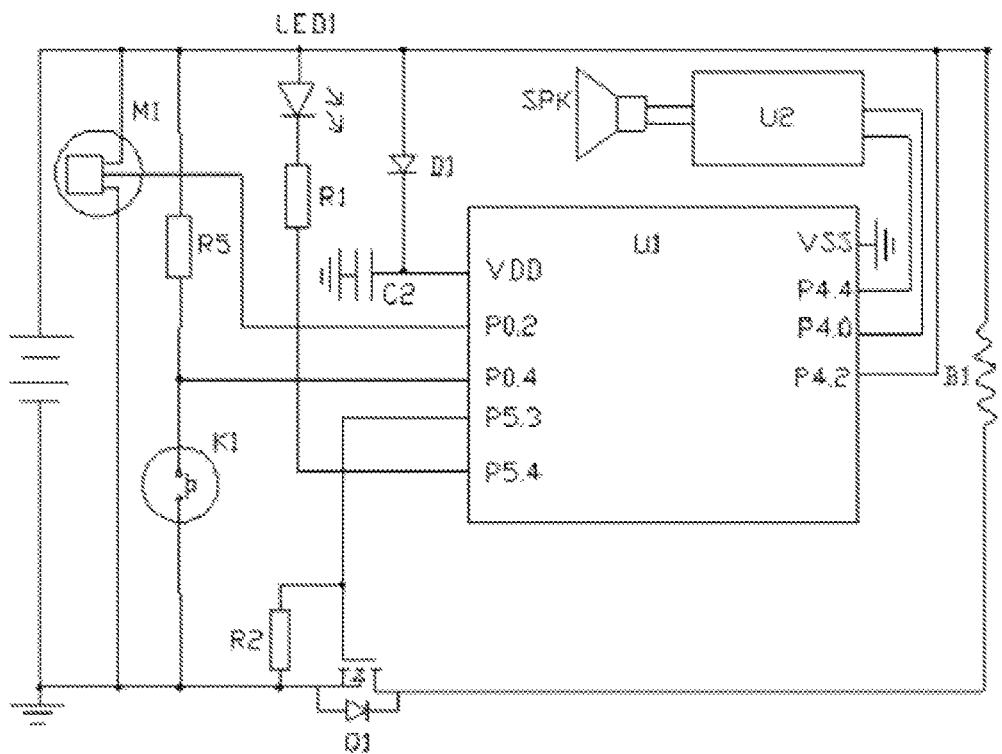
FIG. 4 is circuit diagram of the second embodiment of the electronic cigarette of the present invention.

Referred to FIG. 4, the function switch 6 is a key switch K1. The P0.4 pin of the microprocessor U1 is connected to the anode of the battery via the resistance R5, the P0.4 pin of the microprocessor U1 is further connected to the cathode of the battery via the key switch K1. In this embodiment, turning on the key switch K1 represents turning on the voice compliment function, turning off the key switch K1 represents turning off the voice compliment function.

If the user press the key switch K1, then the key switch K1 is turned off, the P0.4 pin is grounded and receives low level, then the microprocessor U1 judges that the voice compliment function should be turned off at this time. If is needs to be turned on, then the key switch K1 should be pressed again, the P0.4 pin is connected to the cathode of the battery via the resistance R5 and receives high level, then the microprocessor U1 judges that the voice compliment function should be turned on at this time.

Figure 5:
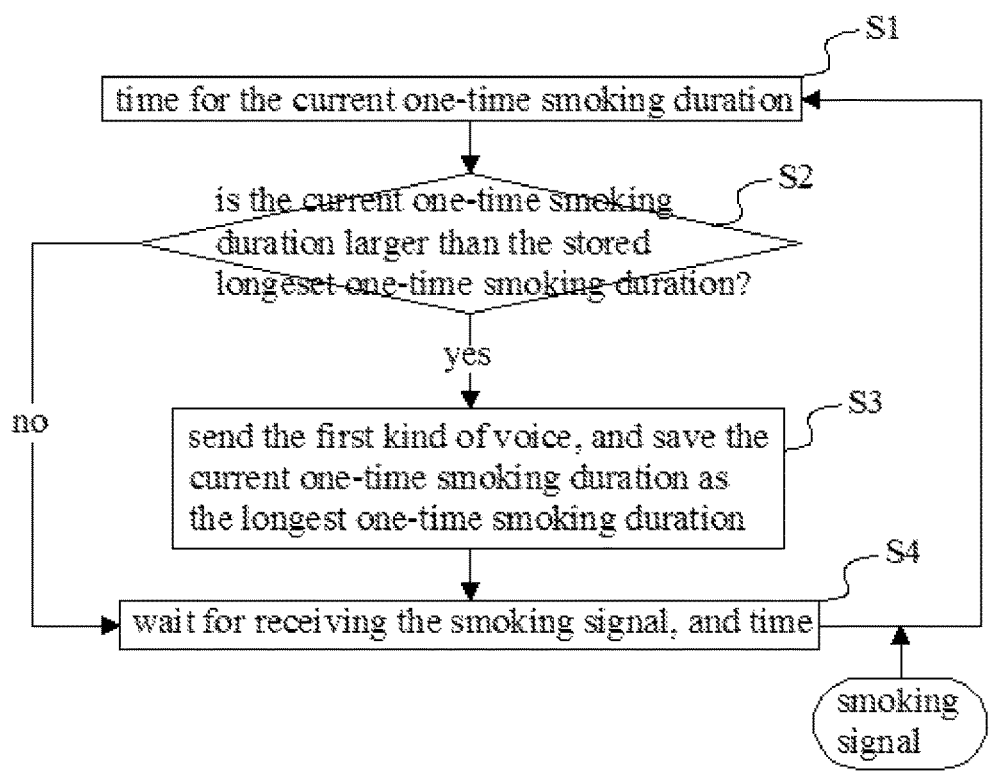
FIG. 5 is a program flow diagram of the first embodiment of the voice control method for electronic cigarette of the present invention.

FIG. 5 is a program flow diagram of the first embodiment of the voice control method for electronic cigarette of the present invention;

The structure of the electronic cigarette is referred to the above content, the microprocessor U1 comprises a storing unit, a main controlling unit, a timing unit and a judging unit; the storing unit records and stores the longest one-time smoking duration and the first preset time.

The first embodiment is configured for the situation that the one-time smoking duration is larger than the longest one-time smoking duration to praise, the default longest one-time smoking duration is 0. The one-time smoking represents the process of receiving one smoking signal. The one-time smoking duration is the duration that a smoking signal is sent, and is the duration of each smoke when the user smokes.

the method comprises following steps when a smoking signal is received:

S1. an electronic cigarette starts an atomization operation, and times a current one-time smoking duration, after timing enters a step S2, the one-time smoking represents a process of receiving an one-time smoking signal;

S2. determine whether the current one-time smoking duration is greater than a longest one-time smoking duration recorded in the electronic cigarette, if yes, then proceed to a step S3; otherwise, proceed to a step S4;

S3. play a user compliment voice, and use the current one-time smoking duration to update the longest one-time smoking duration, proceed to the step S4;

S4. wait for receiving the smoking signal again, and proceed to the step S1 when receiving the smoking signal.

The voice compliment comprises music compliment and language compliment, which means that it can praise via the form of playing music or language.

The voice compliment comprises: lighting or flashing, to realize the double enjoyment of the auditory and vision.

Playing the user compliment voice comprises following steps:

A microprocessor U1 sends a control signal to a voice microcontroller U2 to designate a voice code that need to be output; the voice microcontroller U2 chooses a designated voice code of the microprocessor U1 to compound to output to a speaker SPK; the speaker SPK outputs a voice.

The specific of the first kind of voice is not restricted, for example it can be simple "hello", "great", or tell the user the specific compliment content "your smoking duration breaks the record!" and so on. By adding the encouragement and the compliment for the one-time smoking duration, the interaction with the user is realized, it makes the user happy and gives the user encouragement in time and motivation of quitting smoking and new feeling, it contributes to helping the user stay away from the cigarettes to realize quitting smoking.

Figure 6:
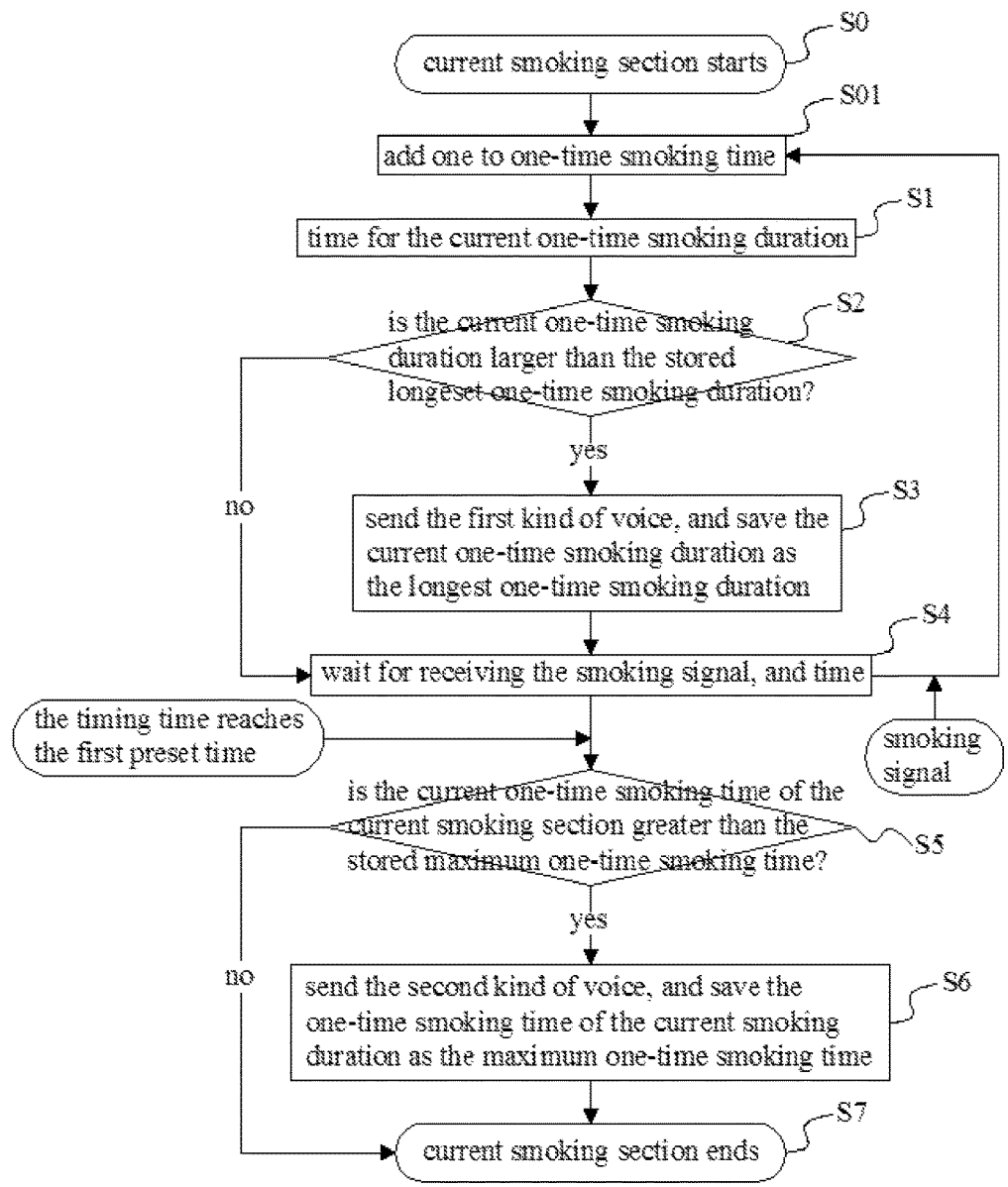
FIG. 6 is a program flow diagram of the second embodiment of the voice control method for electronic cigarette of the present invention.

Certainly the encouragement content can be the smoking time, for example the second embodiment, FIG. 6 is a program flow diagram of the second embodiment of the voice control method for electronic cigarette of the present invention;

The difference of the second embodiment with the first embodiment is: based on the first embodiment, the function of voice compliment for that the one-time smoking time in the current smoking section is greater than the maximum one-time smoking time. If the time interval between the current one-time smoking with the last one-time smoking is larger than the first preset time, then the current one-time smoking represents a start of a smoking section;

The microprocessor U1 further comprises a timing unit, the storing unit further stores the maximum one-time smoking time.

The second embodiment specifically comprises:

S0: start a current smoking section, the timing unit set the one-time smoking time as 0;

The electronic cigarette receives the smoking signal, and executes following steps:

S01: add one to the one-time smoking time; the step S01 can be executed at any time after receiving the smoking signal; for example any time after receiving the smoking signal and before the step S4.

S1: the main controlling unit controls the electronic cigarette to atomize, the timing unit times for the current one-time smoking duration and send the timing result to the judging unit, proceed to the step S2;

S2, the judging unit obtains the longest one-time duration from the storing unit, and judges whether the current one-time duration is larger than the recorded longest one-time duration, if yes, then proceed to the step S3; otherwise, proceed to the step S4;

S3, the main controlling unit controls the voice module 5 to play the user compliment voice (the first kind of voice), and stores the current one-time duration to the storing unit to update the longest one-time duration, proceed to the step S4;

S4, the main controlling unit waits for receiving a smoking signal again, while the timing unit starts to time;

If the timing time reaches the first preset time, then the timing unit sends the information that instructs the waiting time reaches the first preset time to the main controlling unit, proceed to the step S5; if the main controlling unit receives the smoking signal and do not receive the information that instructs the waiting time reaches the first preset time sent by the timing unit, then the main controlling unit notices the timing unit to stop timing, proceed to the step S1;

S5, the timing unit sends the one-time smoking time to the judging unit, the judging unit obtains the maximum one-time smoking time from the storing unit, and judges whether the one-time smoking time sent by the timing unit is greater than the maximum one-time smoking time obtained by the storing unit, if yes, proceed to the step S6, otherwise, proceed to the step S7;

S6, the main controlling unit controls the voice module 5 to play the user compliment voice (the second kind of voice), and stores the one-time smoking time of the current smoking section to the storing unit to update the maximum one-time smoking time, proceed to the step S7;

S7, the current smoking section ends.

The specific of the second kind of voice is also not restricted, for example "the smoking time breaks the record". At this time, it gives voice encouragement for the one-time smoking duration, and praises in time for the situation that the smoking time breaks the record.

Figure 7:
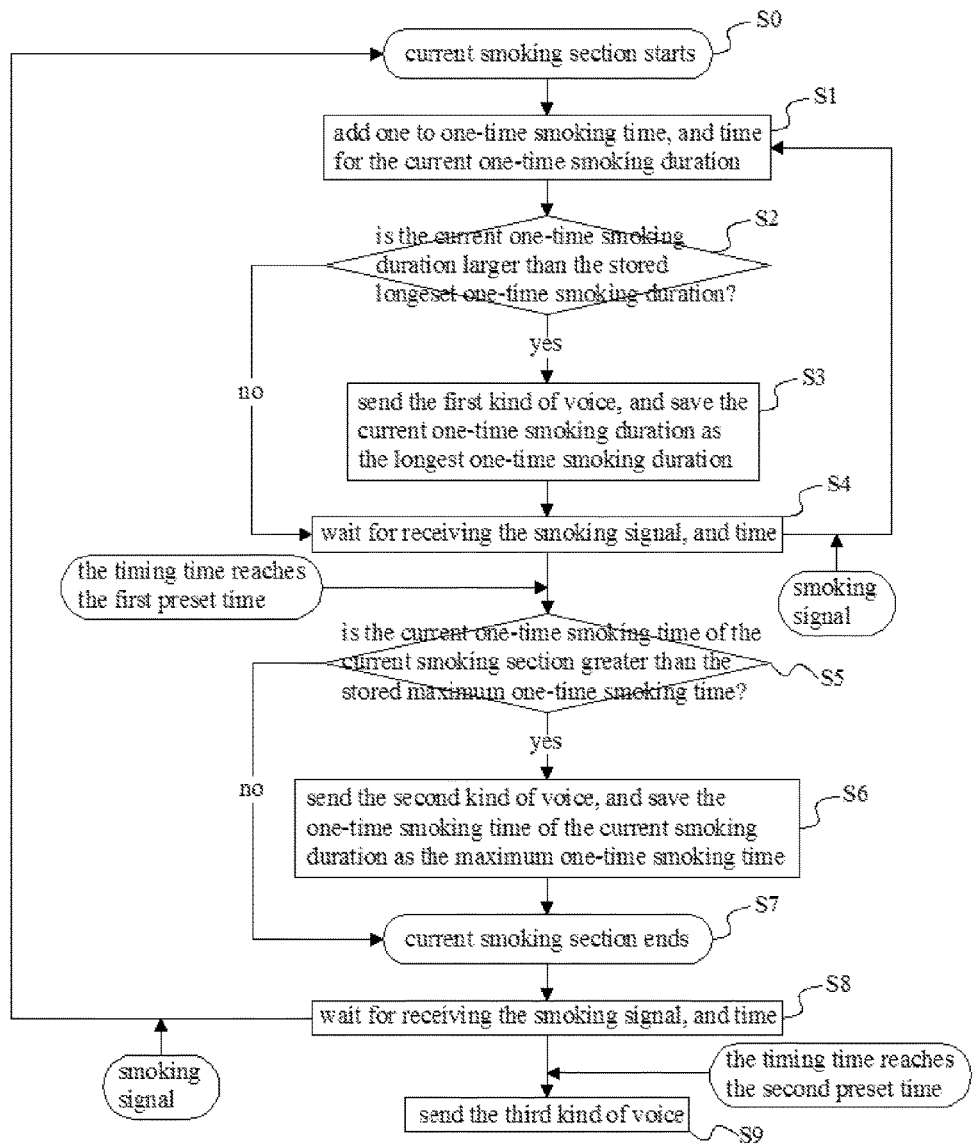
FIG. 7 is a program flow diagram of the third embodiment of the voice control method for electronic cigarette of the present invention.

The users may actively use the electronic cigarette to replace the cigarette at first in the process of quitting smoking, but after a little longer time, the initiative may reduce, thus if the electronic cigarette can actively remind the users then it can play a certain supervisory role. For example the third embodiment, FIG. 7 is a program flow diagram of the third embodiment of the voice control method for electronic cigarette of the present invention.

The difference of the third embodiment with the second embodiment is: a function of timing after the end of a smoking section and reminding when the timing time reaches the second preset time is added, after the step S7 comprises:

S8, the main controlling unit waits for receiving the smoking signal again, the timing unit starts to time, and sends the information that instructs the waiting time reaches the second preset time to the main controlling unit when the timing time reaches the second preset time, if the main controlling unit receives the smoking signal and does not receive the information that instructs the waiting time reaches the second preset time to the main controlling unit, then the main controlling unit notices the timing unit to stop and reset timing, proceed to the step S0; if the main controlling unit receives the information that instructs the waiting time reaches the second preset time to the main controlling unit, then proceed to the step S9;

S9, the main controlling unit controls the voice module 5 to play user compliment voice (the third kind of voice).

After the step S9 reminds, the user may not hear the reminding voice or may forget after a while, thus, if the user still does not use the electronic cigarette for a long time after reminding, then advantageously, after the end of the step S9, it further comprises proceeding to the step S8. It can realize reminding again and again until the user inputs smoking signal.

Advantageously, the user can determine the state of turning on and turning off the above voice reminding function, it can be realized by turning on and turning off the function switch of the electronic cigarette.

In conclusion, the present invention times for one-time smoking duration, if the one-time smoking duration is greater than the longest one-time duration recorded in the electronic cigarette, then the electronic cigarette gives a voice compliment. The interaction between the user and the electronic cigarette can be realized, which makes the user happy, encourages the user in time, and give the user the motivation to quit smoking and freshness, contributing to the user away from the cigarette to realize quitting smoking.

Combining with the accompanying drawings, embodiments of the present invention are described. However, the present invention is not limited by the above embodiments, which means that the above specific embodiments are only schematic, rather than restrictive. It should be understood that, in the inspiration of the present invention, those skilled in the art who appreciate and realize all or part of the process in above embodiments may make many modifications or alternatives, without going beyond the purpose and the scope the claims intend to protect of the present application. All these belong to the protection of the present invention.

What is claimed is:

1. An audio control method for an electronic cigarette, wherein the method comprises following steps when a smoking signal is received:
    S1. start an atomization operation for an electronic cigarette, and time a current one-time smoking duration, after timing, proceed step S2, the one-time smoking represents a process of receiving an one-time smoking signal;
    S2. determine whether the current one-time smoking duration is greater than a longest one-time smoking duration recorded in the electronic cigarette, if yes, then proceed to step S3;
    otherwise, proceed to step S4;
    S3. play a recorded message to a user, and use the current one-time smoking duration to update the longest one-time smoking duration, proceed to the step S4;
    S4. wait for receiving the smoking signal again, and proceed to the step S1 when receiving the smoking signal.

2. The audio control method for an electronic cigarette according to claim 1, wherein the method comprises adding one to one-time smoking time when receiving the smoking signal;
    the method further comprises step S0 before the step S1: start a current smoking section, the one-time smoking time is set as 0, if a time interval between a current one-time smoking and a last one-time smoking is larger than a first preset time, then the current one-time smoking represents a start of a smoking section;
    the step S4 further comprises: time when waiting for receiving the smoking signal again simultaneously;
    in the step S4: if a timing time reaches the first preset time, then proceed to step S5, if the smoking signal is received before the timing time reaches the first preset time, add one to the one-time smoking time, then proceed to the step S1;
    S5. determine whether the one-time smoking time of the current smoking section is greater than a maximum one-time smoking time recorded in the electronic cigarette, if yes, then proceed to a step S6; otherwise, proceed to a step S7;
    S6. play a recorded message to the user, and use the one-time smoking time of the current smoking section to update the maximum one-time smoking time, proceed to the step S7;
    S7. end the current smoking section.

3. The audio control method for an electronic cigarette according to claim 2, wherein the method further comprises after the step S7:
    S8. wait for receiving the smoking signal again, and start timing;
    if a timing time reaches a second preset time, then proceed to step S9, if the smoking signal is received before the timing time reaches the second preset time, then proceed to the step S0;
    S9. play a reminding sound to the user.

4. The audio control method for an electronic cigarette according to claim 3, wherein proceed to the step S8 after the step S9.

5. The audio control method for an electronic cigarette according to claim 1, wherein the recorded message comprises: music, playing the recorded message, and lighting or flashing simultaneously.

6. The audio control method for an electronic cigarette according to claim 1, wherein the method further comprises: turn off or on a recorded message function at any time.

7. The audio control method for an electronic cigarette according to claim 1, wherein playing the recorded message to the user comprises following steps: a microprocessor (U1) sends a control signal to an audio microcontroller (U2) to designate an audio code that need to be output;
    the audio microcontroller (U2) chooses the designated audio code of the microprocessor (U1) to compound to output to a speaker (SPK);
    the speaker (SPK) outputs a sound.

8. An electronic cigarette, the electronic cigarette comprises an atomizing module (2) configured to atomize tobacco tar, a power supply module (1), a smoking switch (3) configured for sending a smoking signal, and a controlling module (4) configured for controlling the power supply module (1) to supply power for the atomizing module (2) when receiving the smoking signal, wherein the electronic cigarette further comprises an audio module (5);

the power supply module (1), the atomizing module (2), the smoking switch (3) and the audio module (5) are connected to the controlling module (4), respectively;

the controlling module (4) is configured for recording a longest one-time smoking duration, the one-time smoking represents a process of receiving an one-time smoking signal;

the controlling module (4) is further configured for timing for a current one-time smoking duration, and determining whether the current one-time smoking duration is greater than the longest one-time smoking duration recorded in the electronic cigarette, if yes, then controlling the audio module (5) to play a recorded message to a user, and using the current one-time smoking duration to update the longest one-time smoking duration.

9. The electronic cigarette according to claim 8, wherein the controlling module (4) is further configured for recording a maximum one-time smoking time, the controlling module (4) is further configured for counting a one-time smoking time of a current smoking section, and determining whether the one-time smoking time of the current smoking section is greater than the maximum one-time smoking time recorded in the electronic cigarette, if yes, then controlling the audio module (5) to play a recorded message to a user, and using the one-time smoking time of the current smoking section to update the maximum one-time smoking time;

if a time interval between a current one-time smoking and a last one-time smoking is larger than a first preset time, then a current one-time smoking represents a start of a smoking section, a number of a one-time smoking time in the smoking section is N (N≥1), and a time interval between two adjacent one-time smoking in the smoking section is smaller than the first preset time.

10. The electronic cigarette according to claim 9, wherein the controlling module (4) is further configured for timing when the current smoking section ends, if the controlling module (4) does not receive the smoking signal in a second preset time, then controls the audio module (5) to play a reminding sound to the user.

11. The electronic cigarette according to claim 8, wherein the controlling module (4) comprises a microprocessor (U1), the audio module (5) comprises an audio microcontroller (U2) configured for recording various audio codes and a speaker (SPK);

the microprocessor (U1) is connected to the audio microcontroller (U2), the audio microcontroller (U2) is connected to the speaker (SPK);

the microprocessor (U1) is configured for controlling the audio microcontroller (U2) to choose an audio code, the audio microcontroller (U2) is configured for choosing a designated audio code of the microprocessor (U1) to compound to output to the speaker (SPK).

12. The electronic cigarette according to claim 8, wherein the electronic cigarette further comprises a function switch (6) which is connected to the controlling module (4) and is configured for turning on or off a recorded message function.

13. The electronic cigarette according to claim 10, wherein the audio module (5) comprises an audio microcontroller (U2) configured for recording various audio codes and a speaker (SPK), a microprocessor (U1) is connected to the audio microcontroller (U2), the audio microcontroller (U2) is connected to the speaker (SPK);

the power supply module (1) comprises a battery, the atomizing module (2) comprises a electrical heating wire (B1), the controlling module (4) comprises the microprocessor (U1) and a MOS tube (Q1), the smoking switch (3) is an air flow sensor (M1), a source electrode of the MOS tube (Q1) is connected to a cathode of the battery, a drain electrode of the MOS tube (Q1) is connected to an anode of the battery via the electrical heating wire (B1), a grid electrode of the MOS tube (Q1) is connected to the microprocessor (U1); a signal output end of the air flow sensor (M1) is connected to the microprocessor (U1).

\* \* \* \* \*